United States Patent
Buhl et al.

(10) Patent No.: US 8,913,703 B2
(45) Date of Patent: Dec. 16, 2014

(54) METHOD AND DEVICE FOR DETERMINING A QUALITY OF A CLOCK SIGNAL

(75) Inventors: Michael Bernhard Buhl, Grafing (DE); Dragan Obradovic, Ottobrunn (DE); Günter Steindl, Poppenricht (DE); Philipp Wolfrum, München (DE)

(73) Assignee: Siemens Aktiengesellschaft, Munich (DE)

( * ) Notice: Subject to any disclaimer, the term of this patent is extended or adjusted under 35 U.S.C. 154(b) by 182 days.

(21) Appl. No.: 13/598,974

(22) Filed: Aug. 30, 2012

(65) Prior Publication Data

US 2013/0223496 A1  Aug. 29, 2013

(30) Foreign Application Priority Data

Aug. 30, 2011 (EP) .................................. 11179296

(51) Int. Cl.
| | |
|---|---|
| H04L 7/027 | (2006.01) |
| H04L 1/20 | (2006.01) |
| H04L 7/00 | (2006.01) |
| H04W 56/00 | (2009.01) |
| H04J 3/06 | (2006.01) |
| H04J 3/14 | (2006.01) |

(52) U.S. Cl.
CPC .......... *H04L 1/20* (2013.01); *H04L 1/205* (2013.01); *H04J 3/0638* (2013.01); *H04J 3/14* (2013.01)
USPC ........... 375/356; 375/354; 375/371; 370/516; 370/506; 370/498; 370/464; 370/350; 370/310; 370/345

(58) Field of Classification Search
USPC ............................ 375/356, 354; 370/350, 503
See application file for complete search history.

(56) References Cited

U.S. PATENT DOCUMENTS

| | | | |
|---|---|---|---|
| 2009/0161744 A1 | 6/2009 | Smith et al. | |
| 2010/0158181 A1* | 6/2010 | Hadzic ........................ | 375/371 |

FOREIGN PATENT DOCUMENTS

| | | |
|---|---|---|
| EP | 1 172 960 | 1/2002 |
| JP | 2003/179142 | 6/2003 |

OTHER PUBLICATIONS

Wilcox, Rand R., Basic Statistics: Understanding Conventional Methods and Modern Insights, Oxford University Press USA, Cary NC, USA, Jul. 2009, Chapter 2: pp. 9-30 and p. 51.*

* cited by examiner

*Primary Examiner* — Chieh M Fan
*Assistant Examiner* — Michelle M Koeth
(74) *Attorney, Agent, or Firm* — Cozen O'Connor

(57) ABSTRACT

Method, device and system for detecting a disturbance, e.g., at least one short mechanical impact (shock or vibration) on a clock of a slave device by detecting a non-typical variation of a tracking error, i.e., a tracking error having a deviation that exceeds a predetermined threshold, wherein such a non-typical variation can be determined by the deviation from a statistical measure, e.g., a variance or a standard deviation, such that the determination of the quality of a clock signal is advantageously allowed and thus suitable counter-measures are provided. The method, device and system are applicable for all kinds of technical systems comprising slave devices that have a clock, e.g., devices in industrial and automation systems. The method, device and system are also applicable in communication systems that use a protocol to synchronize the clocks of its devices, e.g., Profinet.

17 Claims, 2 Drawing Sheets

METHOD AND DEVICE FOR DETERMINING A QUALITY OF A CLOCK SIGNAL

BACKGROUND OF THE INVENTION

1. Field of the Invention

The present invention relates to a method and device for determining a quality of a clock signal in a slave device.

2. Description of the Related Art

Clock synchronization is a basis for proper operation of process automation and control systems. Typically, each element of an automation system (i.e., a slave device) has an internal clock (driven by a quartz) which has to be synchronized with the clock of an (a priori selected) master device.

Profinet-based systems use a given protocol (based, among others, on the Institute of Electrical and Electronic Engineers (IEEE) standard 1588-2008) to enable synchronization. Here, the synchronization is based on sequentially transmitting SYNC-messages from one element to the next in a chain structure. Locally at the slave device, a control algorithm is used to generate a smooth version of the master time estimate, which is called "controlled time", and is the output of the local slave device. The controlled time can then be used by other applications as a precise synchronized time for control and/or communication purposes.

However, conventional solutions are neither able to determine the quality of the value of the controlled time nor to detect sudden external disturbances applied to the synchronization hardware, such as vibrations or shocks.

SUMMARY OF THE INVENTION

It is therefore an object of the invention to overcome the disadvantages mentioned above and in particular to provide a solution that allows a slave device to determine the quality of a controlled time signal and/or to detect sudden disturbances based on, e.g., mechanical impact.

This and other objects and advantages are achieved in accordance with the invention by providing a method for determining the quality of a clock signal in a slave device by which a statistical measure for a tracking error is determined, and a quality of the clock signal is determined based on a deviation of the tracking error from the statistical measure.

Hence, a certain kind of disturbance, e.g., at least one short mechanical impact on the slave device, can be determined by detecting a non-typical variation of the tracking error, i.e., the tracking error having a deviation that is more than a predetermined threshold. The non-typical variation can be determined by the deviation from the statistical measure.

The method in accordance with the invention can be used to determine whether a short disturbance occurred at the slave device and/or whether the quality of the clock signal is good or bad (e.g., if the deviation stays below a predetermined value that is considered bad). Also, counter-measures can be initiated based on the level of quality of the clock signal. It is noted that more than two levels of quality (good, bad) may exist leading to different actions (or no action at all).

In an embodiment, the slave device indicates the quality of the clock signal, such as by raising an alarm flag. Such an indication can be performed locally at the slave device (e.g., towards an application running on the slave device) and/or a message can be sent to at least one element of the communication network, e.g., the master device and/or any other slave device and/or the client application using the synchronized time signal.

In an embodiment, the statistical measure comprises a variance and/or a standard deviation.

In another embodiment, the variance and/or a standard deviation is/are determined based on a filter function.

Various filter functions can be used. One example is a low-pass filter.

In a further embodiment, the filter function corresponds to $$z(k) = (1-a) \cdot z(k-1) + a \cdot e_T^2(k)$$

$$VAR(e_T) = z(k),$$

$$\sigma(e_T) = \sqrt{z(k)}$$

with $e_T$ being the tracking error, $\sigma(e_T)$ being the standard deviation of the tracking error, $VAR(e_T)$ being the variance of the tracking error, k being a step, a being a parameter of the filter.

In a further embodiment, a disturbance of the clock signal is determined based on the quality of the clock signal.

In yet another embodiment, if the quality of the clock signal is below a given threshold, then a master time estimate signal is used by the slave device, and if the quality of the clock signal at least reaches the given threshold, then a controlled time signal is used by the slave device.

Hence, advantageously, if a disturbance is detected via a low quality signal, the master time estimate signal is then used, which is not controlled by the slave device and does not contain the local disturbance applied to the slave device. This can be performed for some cycles after the disturbance has been detected. The controlled time signal of the slave device can then be re-used.

In accordance with another embodiment, the controlled time signal is based on the tracking error and the tracking error is based on a difference between the master time estimate signal and the controlled time.

It should be noted that the controlled time is based on the clock of the slave device, i.e., on the quartz providing clock signals for the slave device.

It should further be noted that the slave device may comprise a proportional-integral (PI) controller (or PI-controller) that processes the tracking error and conveys a controlled signal to the clock. The clock's output is fed back to the entry of the PI-controller, subtracted from the master time estimate and results in the subsequent tracking error. The adaptation can be conducted at discrete time steps that are based on cycles of the slave's clock, i.e., based on a sync message arriving at the slave device (e.g., provided along the chain comprising previous slave devices and the master device).

In accordance with a further embodiment, an interval used for communication purposes is adjusted based on the quality of the clock signal. Hence, the level of quality can be used to adjust the communication interval required by client applications using the output of the synchronization process as a time basis. A good common time basis allows for the packing of communication time slots of different clients sharing one network more densely without causing interference. A good synchronization can thus lead to shorter time slots used for communication purposes, which increases available bandwidth and the overall performance of the system.

In accordance with another embodiment, a standard deviation of the tracking error is determined, Thus, it is determined whether the tracking error is unlikely with respect to the standard deviation by determining a maximum tracking error which could have been caused by a local disturbance. In addition, a disturbance is determined based on a comparison of the maximum tracking error with a function of an estimated variance of the tracking error.

In accordance with yet another embodiment, the maximum tracking error which could have been caused by the local disturbance is determined in accordance with the relationship:

$$e_{mi}(k) = \max(|e_T(k)|, |e_T(k)+e_T(k-1)|).$$

In yet another embodiment, the function of an estimated variance of the tracking error corresponds to the relationship:

$$F = a_0^2 + a_1 \cdot \mathrm{VAR}(e_T),$$

where parameters $a_0$ and $a_1$ constitute a trade-off between false positive detections and false negative detections.

In accordance with a further embodiment, the local disturbance comprises a mechanical shock or a vibration. Hence, any mechanical impact applied to the clock can be detected, in particular in case it is sufficiently strong in comparison to a general noise level and is sufficiently short with regard to a predefined number of clock cycles.

It is also an object of the invention to provide a device for determining a quality of a clock signal comprising a processing unit that is configured to determine a statistical measure for a tracking error, and to determine a quality of the clock signal based on a deviation of the tracking error from the statistical measure.

It should be noted that the steps of the method stated herein may also be executable on this processing unit.

It should be further noted that the processing unit can comprise at least one, i.e., several means that are arranged to execute the steps of the method described herein. The means may be logically or physically separated; in particular several logically separate means could be combined in at least one physical unit.

The processing unit may comprise at least one of the following: a processor, a microcontroller, a hard-wired circuit, an application specific integrated circuit (ASIC), a field-programmable gate array (FPGA) and a logic device.

In accordance with an embodiment of the invention, the device comprises a slave device in a chain of several slave devices, which are provided with a master clock signal by a master device.

In accordance with a further embodiment, the device comprises a PI-controller that processes the tracking error and conveys a controlled signal to a clock, where the clock's output is fed back to the entry of the PI-controller and subtracted from a master time estimate to obtain a subsequent tracking error.

It is also an object of the invention to provide a computer program product directly loadable into a memory of a digital computer, comprising software code portions for performing the steps of the method as described herein.

It is an additional object of the invention to provide a computer-readable medium, e.g., storage of any kind, having computer-executable instructions adapted to cause a computer system to perform the disclosed embodiments of the method in accordance with the invention.

It is a further object of the invention to provide a system comprising at least one device as described herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The aforementioned characteristics, features and advantages of the invention as well as the way they are achieved will be further illustrated in connection with the following examples and considerations as discussed in view of the figures, in which.

DETAILED DESCRIPTION OF THE PREFERRED EMBODIMENTS

Figure 1:
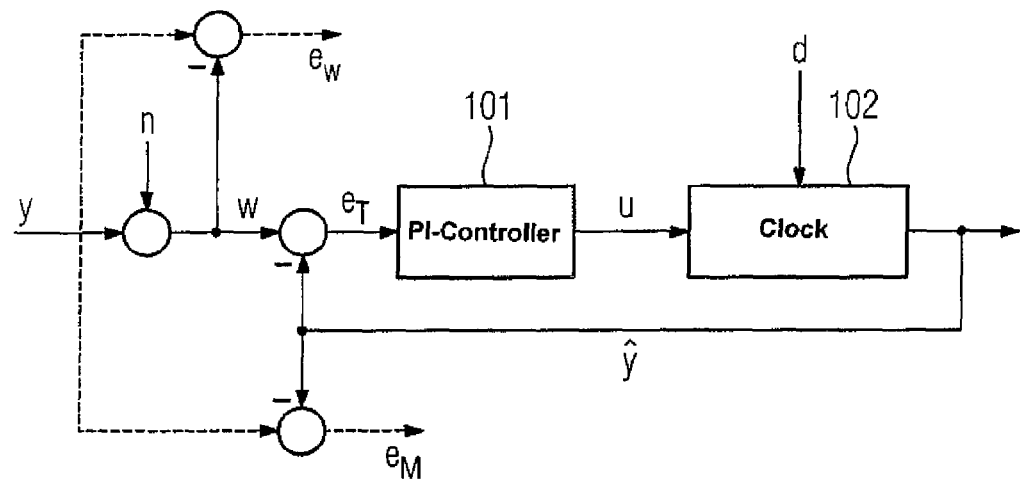
FIG. 1 is a schematic block diagram of a clock synchronization control loop that may be implemented in a slave device.

FIG. 1 shows a structure of a clock synchronization control loop that may be implemented in a slave device. When the clock of the slave device is not (significantly) disturbed by external disturbances (e.g. shocks or vibrations), the only relevant disturbance for the clock synchronization process is a signal n by which an estimated master time w differs from a true master time y. It is noted that the disturbance n comprises all noise and disturbances between the master and this actual slave device (cumulated noise).

An error $e_T$ denotes a tracking error that is input to a PI-controller 101 (i.e., a controller comprising a proportional (P) and an integral (I) portion). The output of the PI-controller 101 comprises a signal u that is fed to a controlled clock 102 of the slave device. The output of the controlled clock 102 is denoted as a controlled time $\hat{y}$, which is subtracted from the estimated master time w.

The controlled clock 102 may be subject to disturbances d (e.g., shocks or vibrations) that lead to a (e.g., temporally) deteriorated clock signal.

A true error $e_M$ is depicted in FIG. 1 as a difference between the true master time y and the controlled time $\hat{y}$ that corresponds to a difference between the tracking error $e_T$ and the disturbance n.

An error $e_W$ indicates a difference between the estimated master time w and the true master time y.

The true master time y can be estimated by a Precision Time Protocol (according to, e.g., Institute of Electrical and Electronic Engineers (IEEE) standard 1588) as a noisy estimate w. This estimate w is a reference signal for the PI-controller 101 and the controlled clock 102 generating a controlled time $\hat{y}$.

The tracking error can be defined as a difference between master time estimate w and controlled time $\hat{y}$, i.e. $e_T = w - \hat{y}$.

The tracking error $e_T$ is a stochastic variable caused by noises occurring in the estimation process and by external disturbances. The variance $\mathrm{VAR}(e_T)$ of the tracking, however, does not fluctuate excessively over time and can be estimated quite accurately locally by using a low pass filter. Hence, the variance $\mathrm{VAR}(e_T)$ can be used as a measure for the volatility of the tracking error $e_T$.

Locally (external) disturbances d have a direct impact on the controlled clock and thus also directly affect the tracking error $e_T$. Therefore, a sudden external disturbance can be detected by monitoring the current tracking error $e_T$, i.e., whether the current tracking error $e_T$ is larger than a predetermined threshold (what can be expected for the tracking error, e.g., based on a previous synchronization interval and/or the previously known variance for the tracking error).

Exemplary Scenario:

Due to estimation errors concerning the line delay and bridge delay, the estimate of the master time w differs from the true master time by the disturbance n. The mean value (bias) of such a disturbance n varies randomly between the slave devices, while the variance of the disturbance n increases along the slave devices that are arranged in a chain topology.

The master time estimate w provided to the PI-controller 101 and consequently also the tracking error $e_T$ are stochastic variables.

A controlled time $\hat{y}$ at a step k+1 can be denoted as:

$$\hat{y}(k+1) = \hat{y}(k) + \Delta S \cdot u(k) + d(k) \cdot u(k),$$

i.e., based on a controlled time $\hat{y}$ at a previous (time) step k. $\Delta S = S(k+1) - S(k)$ refers to a number of ticks of the slave clock between step k and a subsequent one k+1. d(k) refers to a disturbance (e.g., a physical shock applied to the slave device disturbing the slave clock). u(k) is an output of the PI-controller 101 at the step k and corresponds to a ratio of the frequency between the master clock and the slave clock. As an example, $\Delta S$ may be assumed to be constant.

From the dynamics of the controlled time $\hat{y}(k+1)$, it should be appreciated that disturbances d(k) acting upon the clock of the slave device directly influence the controlled time $\hat{y}$. As the tracking error $e_T$ and the true error $e_M$ directly depend on the controlled time $\hat{y}$, both errors are influenced by local disturbances in the same way. Thus, the part of the tracking error $e_T$ that is caused by local disturbances also contains information about the true error $e_M$.

Detection of Short but Significant Local Disturbance:

For detecting short but significant local disturbances, e.g., shocks applied to the slave device, the tracking error $e_T$ is examined. Without such disturbances, the tracking error $e_T$ is mainly excited by the disturbance n, which can be assumed to be normal distributed. Hence, the tracking error $e_T$ with a known probability remains within an interval (e.g., the probability for $e_T$ to stay inside an interval $[-3\sigma, 3\sigma]$ amounts to 0.9973).

Once the clock of the slave device is disturbed by a significant local event, the amplitude of the tracking error $e_T$ may reach a value that is very unlikely with respect to the assumed normal distribution, which in return allows detecting such a local disturbance d(k).

Accordingly, the detection of short but significant local disturbances may comprise the following steps:

(a) determine a standard deviation $\sigma(e_T)$ of the tracking error $e_T$; and (b) decide whether the tracking error $e_T$ is unlikely with respect to the standard deviation $\sigma(e_T)$.

Estimating the Standard Deviation of the Tracking Error:

The standard deviation $\sigma(e_T)$ and/or the variance $\text{VAR}(e_T)$ can be determined utilizing the following filter z(k):

$$z(k) = (1-a) \cdot z(k-1) + a \cdot e_T^2(k)$$

$$\text{VAR}(e_T) = z(k)$$

$$\sigma(e_T) = \sqrt{z(k)}$$

Based on such a filter z(k), the estimated standard deviation matches well with the true standard deviation. For example, the parameter a of the filter can be set to $a(k) = \max(1/k, a_0)$ with $a_0 = 0.002$.

Deciding Whether a Significant Local Disturbance has Occurred:

Mechanical shocks are the most relevant examples for short but significant local disturbances. Therefore, such shocks can be used to demonstrate the ability to detect short significant local disturbances.

Figure 2:
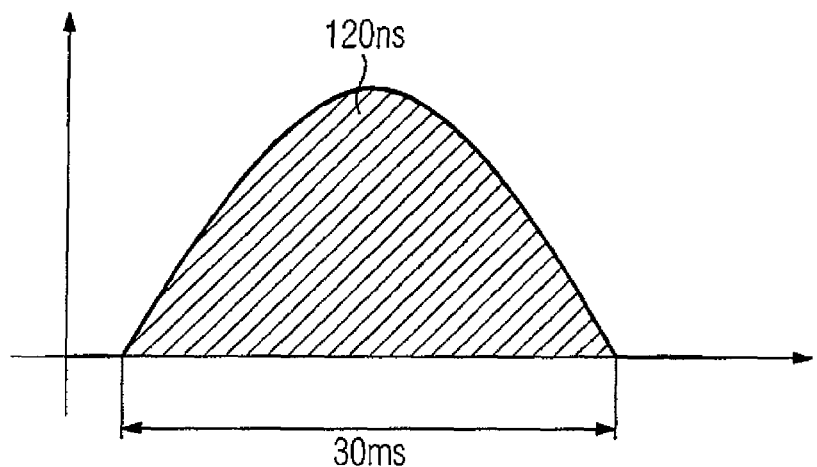
FIG. 2 is a graphical plot of a normalized frequency drift $(f-f_0)/f_0$ caused by mechanical shocks.
Figure 3:
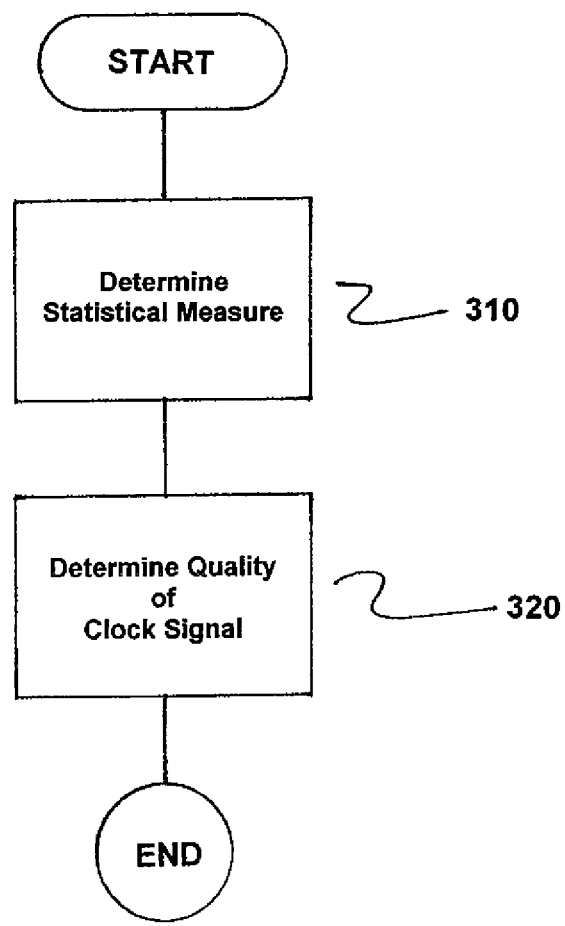
FIG. 3 is flowchart of the method in accordance with an embodiment of the invention.

FIG. 2 is a graphical plot of a normalized frequency drift $(f-f_0)/f_0$ caused by mechanical shocks. For example, an effect of a shock can be modelled by a temporary variation of a quartz frequency as shown in FIG. 2. The integral of the frequency variation is equal to the overall tracking error caused by one shock. As shocks may be spread over two time steps of the local clock, the peak value of the tracking error will in general be less than 120 ns.

In order to detect a shock, the following approach is suggested:

(a) A maximum tracking error which could have been caused by a shock (or other local disturbances) is determined:

$$e_{mi}(k) = \max(|e_T(k)|, |e_T(k) + e_T(k-1)|),$$

(b) The maximum tracking error, i.e., $e_{mi}^2(k)$, can be compared with an appropriate function of the estimated variance of the tracking error. Based on such a comparison, it possible to decide whether a shock has occurred. An appropriate function can be in accordance with the relationship:

$$F = a_0^2 + a_1 \cdot \text{VAR}(e_T),$$

where the choice of the parameters $a_0$ and $a_1$ constitutes a trade-off between false positive detections or type I errors (i.e., a non-existing shock is detected) and false negative detections or type II errors (i.e., an existing shock is not detected). In order to find a good choice for the two parameters, the difference between true positive detections and false positive detections can be optimized using a numerical approach (e.g., by simulation). For example, $a_0$ may be set to 120 ns and $a_1$ may be set to 22.

For optimization of the parameters $a_0$ and $a_1$, several or all slave devices in a chain structure between the master device and an actual slave device can be considered. However, due to the higher level of general noise n, the slave elements that are farther away from the master device have a decreasing ability to detect shocks compared to slave devices that are located close to the master device.

The disclosed embodiments of the invention allow the detection of a disturbance that has a (temporal) detrimental effect on the clock signal of the slave device (hence the quality of the clock signal is poor for a certain period of time). Consequently, this information can be used by the slave device for an efficient data processing. If the disturbance d(k) is detected, then the slave device may use the master time estimate w (which is not adjusted by the PI-controller, but also not affected by the local disturbance) and if the disturbance d(k) is not detected, then the slave device may use the controlled time $\hat{y}$, i.e., the output of the PI-controller.

Advantageously, a physical shock can be determined by using statistic information of the tracking error $e_T$. Any abrupt change of the tracking error $e_T$ can be assessed and used to detect an external disturbance, e.g., a mechanical impact (shock or vibration) on the device. The quality of such a detection can be improved by utilizing a threshold function f which considers various parameters.

Being able to detect any sudden external (i.e., a physical) disturbance bears the advantage that an error or an intrusion towards the system becomes apparent. Suitable countermeasures can thus be initiated.

If an external disturbance is applied to a local slave device, its controlled time deteriorates, i.e., has a lower quality or a higher deviation from the master time. It is of advantage for an application using the controlled time to be aware of the actual quality of the controlled time. Also, suitable measures can be initiated by the application if it is determined that the controlled time does not meet a predetermined level of quality.

In accordance with the disclosed embodiments, a certain kind of disturbance is detected, e.g., at least one short mechanical impact (shock or vibration) on a clock of a slave device by detecting a non-typical variation of a tracking error, i.e., the tracking error providing a deviation that exceeds a predetermined threshold. Such a non-typical variation can be determined by the deviation from a statistical measure, e.g., a variance of a standard deviation. Advantageously, the disclosed embodiments of the invention allow the determination of the quality of a clock signal and to thus provide suitable counter-measures. The disclosed embodiments of the invention are applicable for all kinds of technical systems comprising slave devices that have a clock, e.g., devices in industrial and automation systems. The disclosed embodiments of the invention are applicable in communication systems that use a protocol to synchronize the clocks of its devices, e.g., Profinet.

Although the invention is described in detail by the embodiments above, it is noted that the invention is not at all limited to such embodiments. In particular, alternatives can be derived by a person skilled in the art from the exemplary embodiments and the illustrations without exceeding the scope of this invention.

Thus, while there have been shown and described and pointed out fundamental novel features of the invention as applied to a preferred embodiment thereof, it will be understood that various omissions and substitutions and changes in the form and details of the methods and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining a quality of a clock signal in a slave device, comprising:
    determining a statistical measure for a tracking error;
    determining, by a processing unit, the quality of the clock signal based on a deviation of the tracking error from the statistical measure by:
        determining a standard deviation of the tracking error;
        determining a maximum tracking error causable by a local disturbance to determine whether the tracking error is unlikely with respect to the determined standard deviation; and
        comparing the maximum tracking error with a function of an estimated variance of the tracking error to determine the local disturbance.

2. The method according to claim 1, wherein the statistical measure comprises at least one of a variance and a standard deviation.

3. The method according to claim 2, wherein the at least one of the variance and the standard deviation is determined based on a filter function.

4. The method according to claim 3, wherein the filter function is in accordance with the relationship:

$$z(k)=(1-a)\cdot z(k-1)+a\cdot e_T^2(k)$$

$$\mathrm{VAR}(e_T)=z(k),$$

$$\sigma(e_T)=\sqrt{z(k)}$$

where $e_T$ is the tracking error, $\sigma(e_T)$ is the standard deviation of the tracking error, $\mathrm{VAR}(e_T)$ is the variance of the tracking error, k is a step and a is a parameter of the filter.

5. The method according to claim 1, wherein a disturbance of the clock signal is determined based on the quality of the clock signal.

6. The method according to claim 1, wherein a master time estimate signal is used by the slave device when the quality of the clock signal is below a given threshold, and a controlled time signal is used by the slave device when the quality of the clock signal at least reaches the given threshold.

7. The method according to claim 6, wherein the controlled time signal is based on the tracking error and the tracking error is based on a difference between the master time estimate signal and the controlled time signal.

8. The method according to claim 1, further comprising:
    adjusting an interval used for communication based on the quality of the clock signal.

9. The method according to claim 1, wherein the maximum tracking error causable by the local disturbance is determined in accordance with the relationship:

$$e_m(k)=\max(|e_T(k)|,|e_T(k)+e_T(k-1)|),$$

where $e_T$ is the tracking error and k is a step.

10. The method according to claim 1, wherein the function F of the estimated variance of the tracking error is in accordance with the relationship:

$$F=a_0^2+a_1\cdot\mathrm{VAR}(e_T),$$

where $\mathrm{VAR}(e_T)$ is a variance of the tracking error, k is a step and a is a parameter of the filter;
wherein parameters $a_0$ and $a_1$ indicate a trade-off between false positive detections and false negative detections, respectively.

11. The method according to claim 9, wherein the function F of the estimated variance of the tracking error is in accordance with the relationship:

$$F=a_0^2+a_3\cdot\mathrm{VAR}(e_T),$$

where $\mathrm{VAR}(e_T)$ is a variance of the tracking error, k is a step and a is a parameter of the filter;
wherein parameters $a_0$ and $a_1$ indicate a trade-off between false positive detections and false negative detections, respectively.

12. The method according to claim 1, wherein the local disturbance comprises a mechanical shock or a vibration.

13. A device for determining a quality of a clock signal comprising:
    a subtractor outputting a tracking error;
    a processing unit configured to:
        determine a statistical measure for the tracking error;
        determine the quality of the clock signal based on a deviation of the tracking error from the statistical measure by:
            determining a standard deviation of the tracking error;

determining a maximum tracking error causable by a local disturbance to determine whether the tracking error is unlikely with respect to the determined standard deviation; and comparing the maximum tracking error with a function of an estimated variance of the tracking error to determine the local disturbance.

14. The device according to claim 13, wherein the device comprises a slave device in a chain of a plurality of slave devices provided with a master clock signal from a master device.

15. The device according to claim 13, wherein the device comprises a proportional-integral (PI) controller that processes the tracking error and conveys a controlled signal to a clock; and wherein an output of the clock is fed back to an entry of the PI-controller and subtracted from a master time estimate to obtain a subsequent tracking error.

16. The device according to claim 14, wherein the device comprises a proportional-integral (PI) controller that processes the tracking error and conveys a controlled signal to a clock; and wherein an output of the clock is fed back to an entry of the PI-controller, subtracted from a master time estimate to obtain a subsequent tracking error.

17. A system comprising at least one device according to claim 13.

* * * * *